No. 851,695. PATENTED APR. 30, 1907.
W. S. RUGG.
ROTARY CONVERTER SYSTEM.
APPLICATION FILED JAN. 30, 1905.

WITNESSES:
F. H. Miller
Otto S. Schairer

INVENTOR
Walter S. Rugg
BY
Wesley G. Carr
ATTORNEY

UNITED STATES PATENT OFFICE.

WALTER S. RUGG, OF NEW YORK, N. Y., ASSIGNOR TO WESTINGHOUSE ELECTRIC & MANUFACTURING COMPANY, A CORPORATION OF PENNSYLVANIA.

ROTARY CONVERTER SYSTEM.

No. 851,695.   Specification of Letters Patent.   Patented April 30, 1907.

Application filed January 30, 1905. Serial No. 243,290.

*To all whom it may concern:*

Be it known that I, WALTER S. RUGG, a citizen of the United States, and a resident of New York, in the county of New York and State of New York, have invented a new and useful Improvement in Rotary Converter Systems, of which the following is a specification.

My improvement relates to systems of electrical distribution embodying rotary converters, and it has for its object to provide means for controlling the speed of such machines.

Under certain conditions of operation of rotary converters connected with large systems of distribution, the machines tend to attain dangerous speeds and some means is therefore desirable for preventing an increase of speed beyond a certain limit. The means generally employed consists of circuit-breakers which are operated to open the direct current circuit or circuits. While the interruption of the direct current circuit will serve to prevent a rotary converter from attaining a dangerous speed, provided a suitable governing means is employed, I prefer to utilize a means which will automatically regulate the speed of the converter without putting it out of service. I have therefore devised the means shown in the accompanying drawings, in which Figure 1 is a diagram of a system embodying one form of my invention and Fig. 2 is a similar view of a modification.

Figure 1:
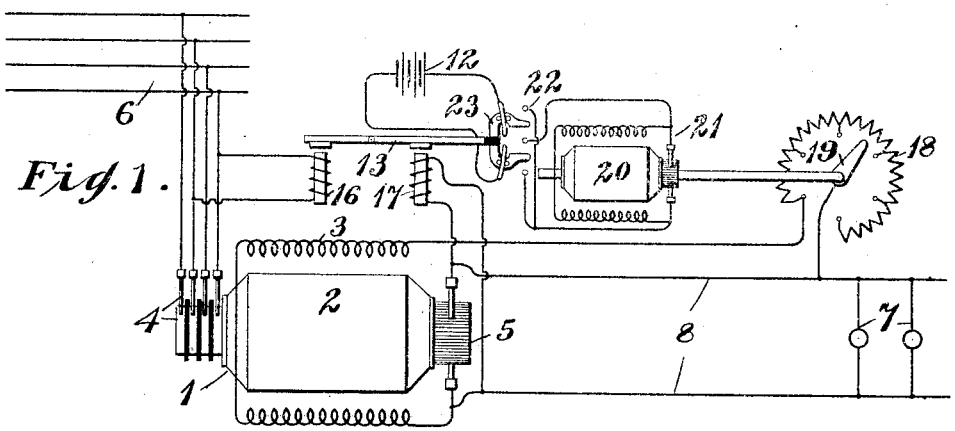
Figure 2:
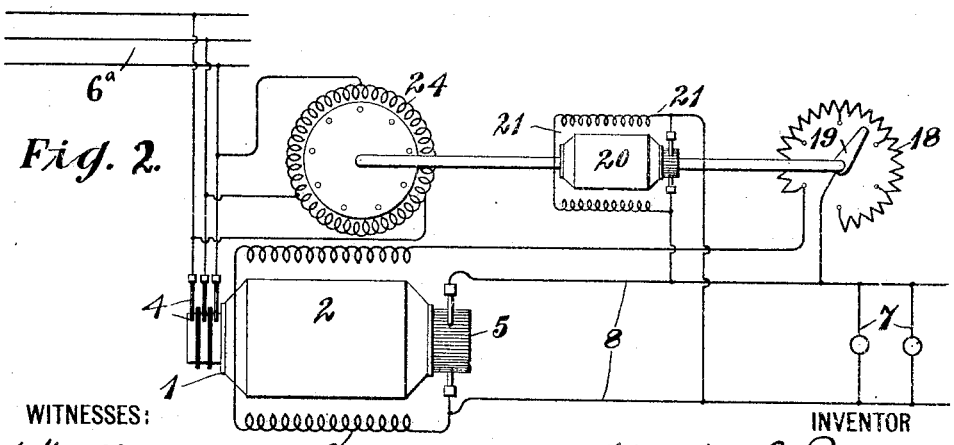

Referring first to Fig. 1, the rotary converter 1, comprising an armature 2, field magnet windings 3, collector rings and brushes 4 and a commutator 5, is supplied with alternating current energy from a two-phase circuit 6, through the collector rings and brushes 4, and supplies direct current energy to translating devices 7, through conductors 8, by means of the commutator 5.

As here shown, an adjustable rheostat 18 is connected in series with the field magnet winding 3 and its movable member 19 is connected, by suitable gearing, to the armature 20 of a small shunt-wound motor 21, the circuit of which is opened and closed by means of a double throw switch 22 in the circuit of a battery 12. The movable member 23 of the switch 22 is mounted upon a movable bar 13 formed of magnetizable material or provided with magnetizable parts within the magnetic field of two magnets 16 and 17, the winding of the former being connected across two conductors of the circuit 6 and the winding of the latter being connected across the circuit 8.

When the movable member 23 of the switch 22 is in the position indicated in the drawing, the circuit of the motor 21 is open. If the member 13 is attracted by the magnet 17, switch member 23 will be actuated to so connect the motor 21 with the battery terminals that it will actuate the arm 19 in the proper direction to cut resistance out of the field magnet circuit of the rotary converter; and if the magnet 16 attracts the other end of the member 13, the switch 22 will be moved to so connect the motor 21 to the battery as to effect rotation of its armature 20 in the opposite direction and thus correspondingly move the arm 19 to cut resistance into the field magnet circuit of the rotary converter 1.

In Fig. 2, I have shown the rotary converter 1 as supplied with alternating current energy from a three-phase circuit 6ª and have connected across this circuit a three-phase induction motor 24 which is mechanically connected to the armature 20 of a shunt-wound motor 21 that is connected also to the movable member 19 of a rheostat 18. If the torque of each of these motors opposes that of the other, the two will be balanced, except in case of a change in the rate of alternations in the circuit 6ª, and when this change occurs, the motors will rotate in the one direction or the other, depending upon whether the alternations increase or decrease in rate, and consequently the amount of resistance 18 included in the field magnet circuit of the rotary converter will be increased or decreased to effect corresponding control of the rotary converter speed.

Whichever modification is utilized, an alternating current winding and a direct current winding are opposed to each other and consequently a more positive adjustment is effected than is possible when the two windings are both connected to the alternating current circuit.

The controlling devices shown in Fig. 1 may, if desired, be mounted upon the main switchboard, and the employment of a separate circuit between the rotary converter and the switchboard be thereby avoided.

The form and relative location of parts may be varied materially from what is shown, without departing from my invention, and I therefore desire it to be understood that no limitations are to be imposed, except such as are rendered necessary by what is embodied in the prior art.

I claim as my invention:

1. The combination with a rotary converter and a rheostat for varying its field magnetization, of two opposing electro-magnetic devices connected to the movable member of the rheostat one of which is energized from the alternating current circuit and the other of which is energized from the direct current circuit to which the rotary converter is connected.

2. The combination with a rotary converter and a speed regulating device therefor, of two opposing controlling devices for said speed regulating device that are respectively energized from the alternating current circuit and from the direct current circuit to which the rotary converter is connected.

3. The combination with a rotary converter and speed regulating means therefor, of two opposing magneto-electric adjusting devices for said speed regulating means, one of which is energized from the alternating current circuit, and the other of which is energized from the direct current circuit to which the rotary converter is connected.

4. The combination with a rotary converter and a speed regulating means therefor, of two opposing electro-magnetic devices for adjusting said speed regulating means and electrical connections between said opposing devices and the respective circuits to which the rotary converter is connected.

5. The combination with a rotary converter and means for adjusting the field magnet excitation thereof, of a motor for actuating said adjusting means and an electro-magnetic device having opposing windings that are respectively connected to the alternating current circuit and to the direct current circuit to which the rotary converter is connected, for controlling the direction of rotation of said motor in accordance with the rate of alternations in said alternating current circuit.

6. The combination with a rotary converter and a rheostat, of an electro-magnetic means for connecting more or less of the resistance of said rheostat in circuit with the field magnet winding of the rotary converter, said electro-magnetic means having two windings that are respectively connected to the alternating current circuit and to the direct current circuit of the rotary converter so that each shall oppose the other.

In testimony whereof, I have hereunto subscribed my name this 20th day of January, 1905.

WALTER S. RUGG.

Witnesses:
Wm. H. Capel,
George H. Stockbridge.